Patented June 2, 1953

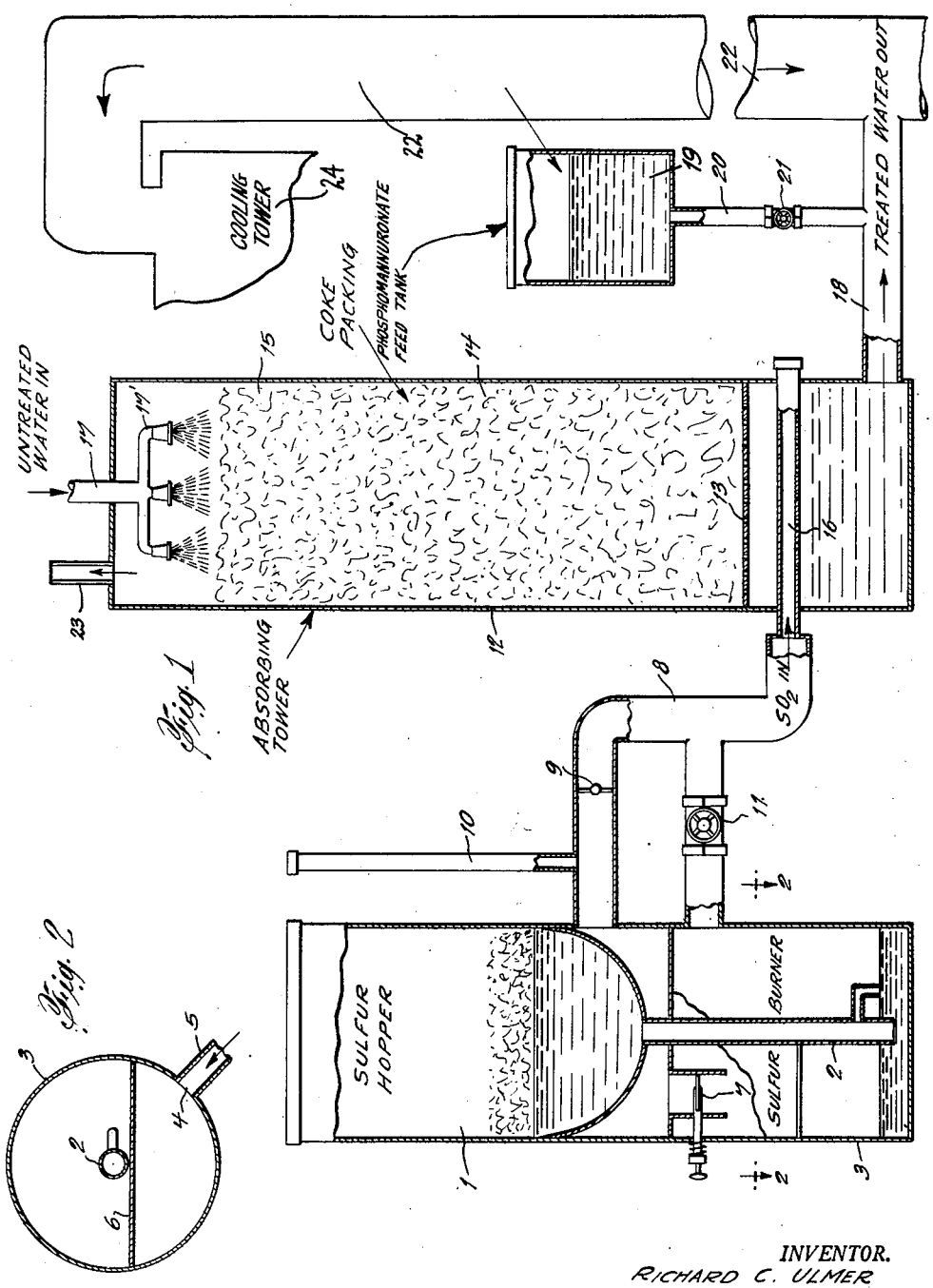

2,640,808

UNITED STATES PATENT OFFICE 2,640,808

METHOD OF AND MATERIAL FOR TREATING WATER

Richard C. Ulmer, Tuckahoe, N. Y., assignor to E. F. Drew & Co., Inc., New York, N. Y., a corporation of Delaware Application July 5, 1947, Serial No. 759,259

7 Claims. (Cl. 210—16)

The present invention is directed to the treatment of water and more particularly to the introduction into water of certain chemical substances intended to inhibit or prevent the formation of scale on or the corrosion of metal surfaces with which the water comes in contact. More particularly the water treated in accordance with the present invention is intended for use in cooling towers or the like.

In various procedures it is common to use cooling towers with water flowing over suitable surfaces to cool the same and it has been found that because the water usually contains substantial amounts of salts in solution, there is a problem in the formation of scale on the cooling surfaces of the towers or similar equipment, such scale resulting from the breaking down of such salts as bicarbonate of alkaline earth metals to form the carbonates such as calcium carbonate which is deposited in the form of a scale. Since in cooling towers the temperature of the water is increased and evaporation of water often takes place, the formation of scale is accelerated thereby.

Scale formation has been recognized for a considerable time and it was known that such formation could be eliminated by lowering the alkalinity of the water. However, in order to accomplish this result, it was necessary to lower the pH or alkalinity to such a value that often serious corrosion of metal surfaces resulted. Consequently this method has not proven practical.

There was also used a combination treatment for preventing the formation of scale. This treatment involved both the maintaining of a desired pH or alkalinity and also the use of a chemical treatment. For the control of alkalinity, sulfuric acid had been proposed but the handling of the material is difficult because of its corrosiveness and acid-resistant and elaborate proportioning apparatus had to be provided. Also, it was difficult to accurately proportion the amount of sulfuric acid because of its high dissociation constant and the concentration of the ordinary commercial solutions. For the chemical treatment various materials, usually those having a surface active characteristic, have been used with varying success. Among such substances were the alkali metal polyphosphates which have been amongst the most successful of such materials. However, the polyphosphates tend to revert to normal phosphates and thus lose their solubilizing property for alkaline earth metal salts. Also under some conditions of operation the polyphosphates are inadequate to prevent decomposition of calcium carbonate or other substances with the resultant formation of scale.

The present invention is intended and adapted to overcome the difficulties and disadvantages inherent in prior methods of and materials for the treatment of water, it being among the objects of the present invention to provide a treatment for water which is adapted to prevent scale formation and corrosion of metal surfaces.

It is also among the objects of the present invention to provide a composition of several substances having a cooperative effect in the treatment of water whereby the desired degree of alkalinity is easily and closely controlled and which alkalinity may be maintained without difficulty at the adjusted values.

It is still further among the objects of the present invention to provide a composition which is in itself non-corrosive and easy to handle, which may be readily formed in a continuous operation and continuously fed to the water being treated.

In practicing the present invention there is provided gaseous sulfur dioxide formed by the direct combustion of sulfur in air. The sulfur dioxide is dissolved in water as it is formed to give a solution which is principally sulfurous acid. This solution is mixed with a solution of a polyphosphate-mannuronate. The latter compound is formed by the reaction of an alkali metal polyphosphate with mannuronic acid or the sodium salt thereof, as described in application Serial No. 751,131, filed May 28, 1947 now abandoned, entitled "Mannuronate-Phosphate Water Treating Composition," wherein alkali metal triphosphates, tetraphosphates, hexametaphosphates, metaphosphates and pyrophosphates are specifically described. Any one of a number of polyphosphates may be used for the reaction and the following is the structural formula of a typical compound of this type:

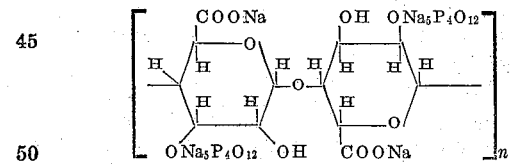

The above complex contains free OH groups and it is believed that at least a part of the sulfurous acid present in the mixed solution combines with the OH groups whereby the sulfur compound is combined with the polyphosphate complex. This combination is probably chemical but it may be physical. The complex formed by the addition of an alkali metal polyphosphate radical in place of a H atom of an OH group on the heterocyclic ring of the mannuronic acid or alkali salt thereof is termed "polyphosphate-mannuronate." Because of this there is no strong acid present at any stage and therefore corrosion by acid presents no difficulty. Part of the sulfur dioxide or sulfurous acid present in the solution reacts with soluble alkaline earth metal salts as typified in the following equations:

(1) $Ca(HCO_3)_2 + SO_2 + H_2O = CaSO_3 + 2H_2CO_3$
(2) $CaSO_3 + O \rightarrow CaSO_4$ The formation of calcium sulfite or similar soluble salts not only lowers the alkalinity to the desired point but also provides a buffer salt which if the alkalinity changes will tend to bring the alkalinity back to the adjusted values.

The invention is more specifically described in conjunction with the accompanying drawing constituting a part hereof and in which like reference characters indicate like parts, and in which Fig. 1 is a vertical cross-sectional view of an apparatus capable of use in carrying out the present invention, some parts being shown diagrammatically and other parts being shown in elevation for clearness, and Fig. 2 is a horizontal cross-sectional view taken along the line 2—2 of Fig. 1.

There is provided a sulfur burner which consists essentially of a covered hopper 1 containing sulfur and a downwardly extending tube 2 reaching almost to the bottom of container 3. Said container has a side opening 4 into which a pipe 5 is fitted. A suitable blower arrangement, not shown, is adapted to force air through pipe 5. Vertical baffle 6 is provided in the upper part of container 3 so that air entering the system is deflected by the baffle downwardly over the surface of the sulfur in the bottom of the container, causing combustion to take place.

The hot products of combustion pass through valved opening 7 into contact with the bottom of hopper 1, thereby heating the same and melting the sulfur to allow it to flow into container 3. The gases of combustion consisting essentially of sulfur dioxide and air minus the oxygen used for combustion, pass through pipe 8, controlled by butterfly valve 9. A vent pipe 10 is provided for venting gases, if desired. A valved by-pass 11 provides direct communication between chamber 3 and pipe 8.

A vertical tower 12 has a perforated plate 13 near the bottom thereof, said plate supporting a mass of coke 14 which fills most of the volume of the tower up to level 15. Perforated pipe 16 in tower 12 just below plate 13 is connected with pipe 8 so that the sulfur dioxide gas is uniformly distributed under the area of plate 13. A pipe 17 entering the top of tower 12 has a number of spray nozzles 17' extending laterally therefrom and adapted to spray water substantially uniformly over the surface of plate 15.

In operation, combustion is started in chamber 3 heating the sulfur burner and causing sulfur to melt and flow into chamber 3. The gases of combustion are vented through vent 10. When the operation of the sulfur burner has reached a point where combustion thereof is self-supporting, air is blown in through inlet 5 and the mixture of $SO_2$ and nitrogen distributed through pipe 16. Said gases pass upwardly through packing 12 coming into intimate contact with water entering through pipe 17 and trickling downwardly over the coke packing. Unabsorbed nitrogen is allowed to pass out into the air through vent pipe 23.

The solution so formed accumulates at the bottom of absorbing tower 12 and passes through pipe 18. There is provided a container 19 communicating with pipe 18 through valved pipe 20. Tank 19 contains a solution of a polyphosphate mannuronate. By means of the valve 21 the amount of the polyphosphate complex fed to the sulfurous acid solution may be accurately regulated. The combined solution is then passed into pipe 22 through which water for a cooling tower 24 or similar equipment passes. Thereby the solutions are diluted to a point commensurate with the needs of the water for scale and corrosion prevention.

The exact amounts of the solution to be used for the purpose depends upon the nature and mineral content of the water. Generally if in the use of the water there is very little, if any, evaporation, it will ordinarily be sufficient to add to the water an amount of the above described solution which will lower the alkalinity to a value ranging from 10 to 100 parts per million (p. p. m.) calculated as calcium carbonate and using methyl orange as an indicator. If, however, the circulating water is concentrated in the cooling tower by evaporation, a substantially greater lowering of the alkalinity in that portion of the water being treated with the above mixture will be necessary. The amount of concentration taking place in the tower will in general serve as a guide as to the degree to which the alkalinity should be lowered. For example, if the concentration in the tower is to about five times that of the original water, it will be satisfactory to lower the alkalinity of the portion of the by-pass water to a value ranging between 10 and 50 parts per million. If the concentration is to ten times that of the original water, then lowering of the alkalinity should be to approximately 10 to 25 p. p. m. In any case, the alkalinity should be adjusted to a point where no scale formation takes place in the cooling tower when the combined treatment is used.

As a specific example of the operation of the invention, there may be used a cooling tower in which in a twenty-four hour period it is necessary to add 725,000 gallons of make-up water. It may be assumed that 575,000 gallons have been lost by evaporation and that 150,000 gallons were lost by windage and blowdown. Assuming that the alkalinity of the make-up water is 210 p. p. m. and that sufficient reduction is practiced so that the water in the cooling tower has an alkalinity ranging from 80 to 150 p. p. m., the desired alkalinity may be maintained by the use of from 150 to 250 lbs. of sulfur per day. Together with the sulfur there would be used an amount of the polyphosphate mannuronate ranging from 8 to 16 lbs. per million pounds of water.

There are numerous advantages inherent in the present invention. Whereas when polyphosphates alone are used to control scale formation, there is a tendency in solution, and particularly at higher temperatures, for reversal to the orthophosphate and a resultant loss of ability to prevent scale formation. The presence of dissolved $SO_2$ tends to prevent such reversion. Also, the complex compound of polyphosphate and mannuronate is considerably more stable in the presence of sulfur dioxide in solution. The $SO_2$ reacts directly with bicarbonates present in the water, reduces the alkalinity, thus increasing the effectiveness of the polyphosphate-mannuronate, forms highly soluble alkaline earth metal sulfites, which act as buffers tending to maintain the pH within the desired limits.

The rate of feed of $SO_2$ solution and the polyphosphate-mannuronate may be readily adjusted relative to each other and relative to the alkalinity desired in the cooling tower water. Such a combination provides a more stable complex which does not break down so easily and thus the effectiveness thereof is considerably prolonged. The $SO_2$ has the added effect, whether it is combined with the complex or is in the free state, of combining with oxygen which may be present in the make-up water being treated. Since free oxygen has a corrosive effect, the combination thereof with the $SO_2$ removes it from any possibility of a corrosive effect.

Since sulfurous acid is much weaker than sulfuric acid, there is avoided any danger of serious acid corrosion. Since it is partly combined in the solution as calcium sulfite, the latter compound would have no corrosive effect. The sulfurous acid being held by the mannuronate radical does not have any tendency to vaporize particularly at the higher temperatures existing in cooling towers and thus the effectiveness thereof is maintained.

Although the invention has been described setting forth the details of the specific operation thereof, the invention is not limited to such details as various changes therein may be made within the spirit of the invention. For instance, other soluble polyphosphates than those specifically named herein may be substituted therefor in whole or in part. The various polyphosphates may be combined with colloids similar to the mannuronates and such colloids are considered equivalent to said mannuronates. The proportions of the constituents in the solution may be varied to suit the conditions under which the same is to be used. These and other changes may be made in the details of the invention within the spirit thereof and the invention is therefore to be broadly construed and not to be limited except by the character of the claims appended hereto.

I claim:

1. A method of treating cooling tower waters which comprises burning sulfur with air to form gaseous $SO_2$, passing the same upwardly through a tower countercurrent to water to be treated so as to dissolve said $SO_2$ in said water, adding to said solution a solution of alkali metal polyphosphate-mannuronate, and conducting said mixed solution to a cooling tower, the amount of $SO_2$ being sufficient to reduce the alkalinity of the water to about 10–100 parts per million and the amount of polyphosphate-mannuronate being from 8 to 16 pounds per million pounds of water, said $SO_2$ being in part combined with said polyphosphate-mannuronate, said $SO_2$ in the free and combined states combining with free oxygen in the water to reduce the corrosive effect thereof, the alkalinity of the solution provided by said polyphosphate-mannuronate promoting the action of said $SO_2$, and said polyphosphate-mannuronate reducing the formation of scale.

2. A method of treating cooling tower waters which comprises burning sulfur with air to form gaseous $SO_2$, the amount of air being such that substantially no free oxygen is present in the gases of combustion, passing the same upwardly through a tower countercurrent to water to be treated so as to dissolve said $SO_2$ in said water, adding to said solution a solution of alkali metal polyphosphate-mannuronate, and conducting said mixed solution to a cooling tower, the amount of $SO_2$ being sufficient to reduce the alkalinity of the water to about 10–100 parts per million and the amount of polyphosphate-mannuronate being from 8 to 16 pounds per million pounds of water, said $SO_2$ being in part combined with said polyphosphate-mannuronate, said $SO_2$ in the free and combined states combining with free oxygen in the water to reduce the corrosive effect thereof, the alkalinity of the solution provided by said polyphosphate-mannuronate promoting the action of said $SO_2$, and said polyphosphate-mannuronate reducing the formation of scale.

3. A method of treating cooling tower waters which comprises burning sulfur with air to form gaseous $SO_2$, passing the same upwardly through a tower countercurrent to water to be treated so as to dissolve said $SO_2$ in said water, adding to said solution a solution of alkali metal polyphosphate-mannuronate sufficient in amount to prevent scale formation in said tower, and conducting said mixed solution to a cooling tower, the amount of $SO_2$ being sufficient to reduce the alkalinity of the water to about 10–100 parts per million calculated as calcium carbonate and determined by methyl orange indicator and sufficient to effect stabilization of said polyphosphate-mannuronate, said $SO_2$ being in part combined with said polyphosphate-mannuronate, said $SO_2$ in the free and combined states combining with free oxygen in the water to reduce the corrosive effect thereof, the alkalinity of the solution provided by said polyphosphate-mannuronate promoting the action of said $SO_2$, and said polyphosphate-mannuronate reducing the formation of scale.

4. A method of treating cooling tower waters which comprises burning sulfur with air to form gaseous $SO_2$, the amount of air being such that substantially no free oxygen is present in the gases of combustion, passing the same upwardly through a tower countercurrent to water to be treated so as to dissolve said $SO_2$ in said water, adding to said solution a solution of alkali metal polyphosphate-mannuronate sufficient in amount to prevent scale formation in said tower, and conducting said mixed solution to a cooling tower, the amount of $SO_2$ being sufficient to reduce the alkalinity of the water to about 10–100 parts per million calculated as calcium carbonate and determined by methyl orange indicator and sufficient to effect stabilization of said polyphosphate-mannuronate, said $SO_2$ being in part combined with said polyphosphate-mannuronate, said $SO_2$ in the free and combined states combining with free oxygen in the water to reduce the corrosive effect thereof, the alkalinity of the solution provided by said polyphosphate-mannuronate promoting the action of said $SO_2$, and said polyphosphate-mannuronate reducing the formation of scale.

5. A method of treating cooling tower waters which comprises burning sulfur with air to form gaseous $SO_2$, passing the same upwardly through a tower countercurrent to water to be treated so as to dissolve said $SO_2$ in said water, adding to said $SO_2$ solution a solution of alkali metal polyphosphate-mannuronate sufficient in amount to prevent scale formation in a cooling tower, then conducting said solution to a cooling tower, the amount of $SO_2$ being sufficient to reduce the alkalinity of the water to about 10–100 parts per million calculated as calcium carbonate and determined by methyl orange indicator, said $SO_2$ being in part combined with said polyphosphate-mannuronate, said $SO_2$ in the free and combined states combining with free oxygen in the water to reduce the corrosive effect thereof, the alkalinity of the solution provided by said polyphosphate-mannuronate promoting the action of said $SO_2$, and said polyphosphate-mannuronate reducing the formation of scale.

6. A method of treating cooling tower waters which comprises burning sulfur with air to form gaseous $SO_2$, passing the same upwardly through a tower countercurrent to water to be treated so as to dissolve said $SO_2$ in said water, adding to said $SO_2$ solution a solution of alkali metal polyphosphate-mannuronate sufficient in amount to prevent scale formation in a cooling tower, then mixing said solution with a relatively large volume of water, conducting said solution to a cooling tower, the amount of $SO_2$ being sufficient to reduce the alkalinity of the water to about 10–100 parts per million calculated as calcium carbonate and determined by methyl orange indicator, said $SO_2$ being in part combined with said polyphosphate-mannuronate, said $SO_2$ in the free and combined states combining with free oxygen in the water to reduce the corrosive effect thereof, the alkalinity of the solution provided by said polyphosphate-mannuronate promoting the action of said $SO_2$, and said polyphosphate-mannuronate reducing the formation of scale.

7. A method of treating cooling tower water to minimize scale formation and corrosion which comprises introducing into said water a solution of sulfur dioxide and an alkali metal polyphosphate-mannuronate, the amount of $SO_2$ being sufficient to reduce the alkalinity of the water to about 10–100 parts per million and the amount of polyphosphate-mannuronate being from 8 to 16 pounds per million pounds of water, said $SO_2$ being in part combined with said polyphosphate-mannuronate, said $SO_2$ in the free and combined states combining with free oxygen in the water to reduce the corrosive effect thereof, the alkalinity of the solution provided by said polyphosphate-mannuronate promoting the action of said $SO_2$, and said polyphosphate-mannuronate reducing the formation of scale.

RICHARD C. ULMER.

References Cited in the file of this patent

UNITED STATES PATENTS

| Number | Name | Date |
| --- | --- | --- |
| 653,741 | Jewell | July 17, 1900 |
| 1,619,036 | Ravenstad | Mar. 1, 1927 |
| 1,762,784 | Kriegsheim | June 10, 1930 |
| 1,903,041 | Hall et al. | Mar. 28, 1933 |
| 2,211,688 | Byck et al. | Aug. 13, 1940 |
| 2,264,654 | Boyd | Dec. 2, 1941 |
| 2,271,499 | Rice | Jan. 27, 1942 |
| 2,277,320 | Gygax | Mar. 24, 1942 |
| 2,304,850 | Rice | Dec. 15, 1942 |
| 2,374,100 | Jackson | Apr. 17, 1945 |
| 2,418,075 | Kollen | Mar. 25, 1947 |

OTHER REFERENCES

Evans, Metallic Corrosion Passivity and Protection, 1946, pages 543 and 575. (Copy in Div. 56.)